Sept. 25, 1923.

W. PATERSON 1,468,739

PROCESS AND APPARATUS FOR MIXING LIQUIDS AND GASES

Filed Aug. 12, 1918     2 Sheets-Sheet 1

INVENTOR
W. Paterson.
BY H. R. Kerslake
ATTORNEY

Sept. 25, 1923.

W. PATERSON 1,468,739

PROCESS AND APPARATUS FOR MIXING LIQUIDS AND GASES

Filed Aug. 12, 1918   2 Sheets-Sheet 2

INVENTOR
W. Paterson
BY H. R. Kerslake
ATTORNEY

Patented Sept. 25, 1923.

1,468,739

UNITED STATES PATENT OFFICE.

WILLIAM PATERSON, OF LONDON, ENGLAND.

PROCESS AND APPARATUS FOR MIXING LIQUIDS AND GASES.

Application filed August 12, 1918. Serial No. 249,573.

*To all whom it may concern:*

Be it known that I, WILLIAM PATERSON, a subject of the King of Great Britain and Ireland, and residing at Windsor House, Kingsway, London, W. C., 2, England, have invented a certain new and useful Improved Process and Apparatus for Mixing Liquids and Gases (for which I have filed application in England Aug. 1, 1917, Patent No. 158,578, and which has been sealed), of which the following is a specification.

This invention relates to the sterilization of water or other liquids by the use of chlorine or other gas and is appli able to any operation in which it is required to add a gas to a liquid in definite proportion.

In such operations as the sterilization of water by the use of chlorine gas, for example, it has been usual to attempt to proportion the addition of the gas by the direct regulation of the flow of chlorine gas in proportion to the volume of flow of the water to be treated but such attempts present great practical difficulties in view of the exceedingly minute rate of flow to be controlled.

The object of the present invention is to obviate the above difficulties so that the amount of gas added may be automatically adjusted in accurate proportion to the volume of liquid to be treated or to which the gas is to be added, and according to my invention I automatically proportion the amount of gas added to the liquid by automatically regulating the flow of a small volume of liquid uniformly impregnated with the gas or charged to definite strength with the gas to be added to the main body of liquid.

Further features of the invention will be apparent from the description given hereafter.

The accompanying drawings illustrate several modes of carrying out the invention:—

Figure 1:
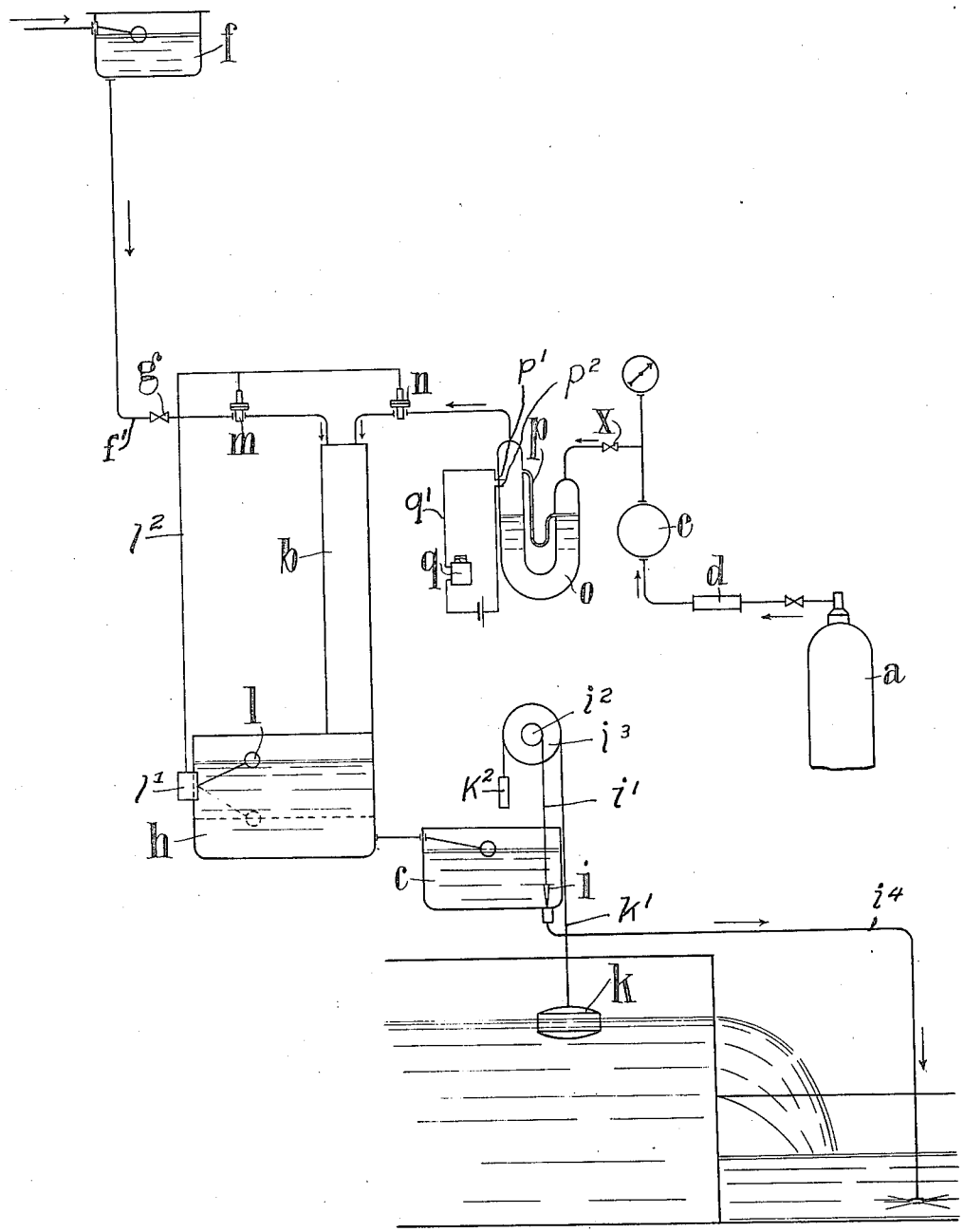
Figure 1 is a diagrammatic view illustrating one form of apparatus arranged in accordance with the invention.

In carrying the invention into effect in one convenient manner as, for example, in its application to the sterilization of water by adding chlorine gas thereto, I provide any usual or suitable source or tank $a$ of chlorine gas which is conveyed by suitable means to an absorber $b$ to which water is supplied, the flow of water and gas being so regulated that the water is chlorinated to a definite predetermined degree, and this chlorinated water is led from the absorber through a tank $h$ and stored in a small container $c$ from which it may be drawn for the purpose of adding it to the main body of water, the flow of chlorinated water being automatically regulated in proportion to the flow of the main body of water, so that by this means it will be certain that the chlorinated gas is always added to the water to be treated in direct proportion to the volume of the water to be treated, it being evident that the problem of regulating the flow of chlorinated water in proportion to the flow of raw water is one which can be readily and accurately solved in any one of a number of ways.

In the arrangement of the apparatus shown in the drawings, chlorine gas is led from the reservoir $a$, through a filter $d$ and reducing valve or valves $e$ to maintain the flow at a constant pressure, and conveniently through a regulating valve $x$ and metering device $o$ to the absorber $b$ to which water is led through a pipe $f'$ from a suitable supply such as a head tank $f$. The pipe $f^1$ is provided with a control valve $g$, so that the flow of water may be accurately adjusted in relation to the flow of chlorine gas and thus the water in the absorber may be chlorinated to a definite degree.

In a semi-automatic apparatus according to the invention, the ratio of the flow of chlorine gas to the water absorbing it is fixed so that an excess of chlorinated water of known strength over maximum requirements is maintained. This excess is permitted to accumulate in the reservoir $h$ feeding the automatic device proportioning the chlorinated water to the water to be treated, and which consists of the tank $c$ from which the chlorinated water is drawn off through the tapered valve $i$ controlled by a float $k$ in turn controlled by the main body of water flowing over a weir. The valve head $i$ is suspended from the end of a rope or cable $i'$, which has its other end fixed to a shaft $i^2$ carrying a fixed pulley $i^3$. The float $k$ is secured to one end of a cable $k'$, which passes over the pulley $i^3$ and is provided at its other end with a counterweight $k^2$.

When the water in the main body rises it will raise the float $k$ and this will permit the counter-weight $k^2$ to turn the pulley $i^3$. As the pulley turns it will rotate the shaft $i^2$, and cause the same to wind the rope $i'$ and elevate the valve head $i$ to permit mixture from the tank $c$ to flow through the pipe $i$ and enter the main body of water. The chlorine gas and water may be shut off at any time while the accumulated reserve is drawn upon by manipulating the valves $g$ and $x$, and restarted when the tank is nearly empty, the high and low limits being indicated by any suitable means.

In an automatic modification of the device, the fluctuations of level in the chlorinated water reservoir, at high and low limits, may be utilized for switching on and off a supply of water and chlorine through orifices and metering device previously set to give a definite ratio and ensure a uniform strength of solution. In other words, instead of attemping to regulate closely the flow of chlorine gas to the water to be treated, I arrange for the switching in of a flow of chlorine and water in fixed proportions so as to secure a surplus of chlorinated water in the reservoir, the draw-off from which is regulated by the rate of flow of the raw water.

It is easier to arrange fixed orifices for the chlorine and the water and intermittently to switch the supply to these on and off at a uniform pressure, according to the level in the chlorinated water reservoir, than to attempt to graduate through a wide range the ratio of chlorine to the water to be treated.

A convenient method of switching the chlorine and water on or off at the minimum and maximum levels would be that shown in the drawing in which a float $l$ in the chlorinated water tank operates a valve (not shown) which controls the supply of pressure fluid which flows through the casing $l'$ and pipe $l^2$ to diaphragm valves $m$ $n$ through which the water and chlorine respectively flow to the absorber $b$.

It is obviously all important to have a reliable meter for the supply of the water to the absorber. Any suitable water meter may be used, but I prefer to dispense with the use of this and arrange for a constant pressure to be maintained on a fixed sized orifice, such as by having the valve $g$ set and immovable, which gives a predetermined and constant flow of water from the head tank $f$. The temporary arresting of this flow by the automatic valve $m$ does not prevent the re-establishment of the constant flow when open.

It is equally important to be able accurately to meter the flow of the chlorine gas. This can be effected in several ways; either by measuring the difference in pressure on either side of a restricted orifice in the path of the flow of the chlorine, or the difference in pressure created by its flow through a Venturi tube. These methods are, however, open to the serious objection that the amount of chlorine required to sterilize considerable flows of water is so small and the orifice required to measure the difference of pressure so exceedingly minute, that any small particles of grit or metallic dust may entirely upset the readings of the meter. For instance, for the effective chlorination of one million gallons of water daily, the restricting orifice required to give an appreciable reading on the meter may be about 1/100 inch diameter. Such an inferential type of meter is of very little use for small flows. For this reason I prefer to employ volumetric methods of measurement.

In view of the rapidity with which chlorine is absorbed by water, the flow must be measured before the gas comes into contact with water, and for this reason I interpose between the supply of chlorine gas and the absorber a column of liquid which is not appreciably affected chemically by and has no appreciable effect upon the chlorine gas, as, for example, sulphuric acid, which column may be contained in a U or other shaped tube $o$ and which acts as a liquid seal between the source of supply of the gas and the absorber, the arrangement being such that the chlorine gas must depress or move the column of liquid until it unseals a vent $p$ which then permits of the passing through of the measured quantity of gas, the sealing column then returning to seal the vent.

It will be seen that a certain amount of the liquid will normally occupy the vent tube $p$ and the pressure required to blow the liquid from the tube $p$ will also be sufficient to lower the liquid in the right leg of the tube $o$ and elevate the same in the left leg sufficiently to complete an electric circuit including the contacts $p'$ and $p^2$.

If it is desirable to obtain a record of the actual amount of gas passed, I may employ suitable means whereby the number of pulsations of the sealing column may be measured as, for example, the column may be adapted to make and break an electric circuit $q'$, so that an electrically operated registering mechanism $q$ may be employed.

It will be understood that the metering device $o$ comes into operation only when the chlorine gas is free to flow through the system, that is, when the valve $n$ is opened in the manner above described. Whenever the valve $n$ is open it will be clear that the pressure in the left leg of the U tube $o$ is less than that in the right leg so that liquid in the latter and also in the right hand portion of the vent pipe $p$ is depressed until the liquid level in the right leg falls to a level with the lowest portion of the vent pipe.

The liquid remaining in said vent pipe is then suddenly blown through by the gas in the upper part of the right leg, which gas itself passes through the vent pipe so that momentarily the pressures in the two parts of the U tube will be equalized and the liquid in the left leg will again fall until the levels in both limbs are equal and the vent is again sealed. As soon as this happens the conditions are once again such that the pressure in the right leg exceeds that in the left leg and the above series of operations is repeated, the result being that so long as the valve $n$ is open the gas flow causes a series of pulsations of the liquid in the U tube $o$ permitting of the passage through said U tube at each pulsation of a definite volume of gas equal to the volume moved through by the liquid on each side of the U tube.

Moreover at each such pulsation liquid in the left leg completes the electric circuit of the counter or registering mechanism $q$ so that the latter is actuated to give a record of the number of pulsations or by suitable calibration of the volume of the gas passed, since the volume of gas which has passed through the meter in any given period of time is obviously equal to the volume passed through at each pulsation of the liquid multiplied by the number of pulsations.

Figure 2:
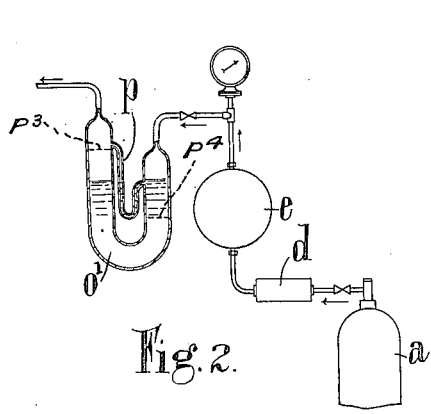

Figures 2 to 6 show several modified forms of meter the construction and operation of which will be readily understood from the following description:

Figure 2 shows dotted lines $p^3$ and $p^4$ illustrating the level of the liquid in the tube $o$ when the pressure of the gas is sufficient to permit the unsealing of the tube $p$.

Figure 3:
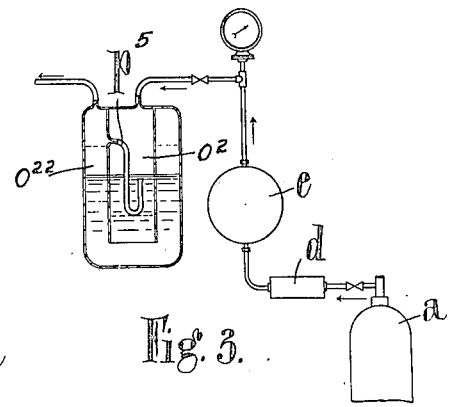

Fig. 3 illustrates an arrangement in which the gas depresses the liquid in a central column $o^2$ and causes its elevation in an outer chamber $o^{22}$. In this arrangement the sealing liquid is blown through the tube $p^5$.

Figure 4:
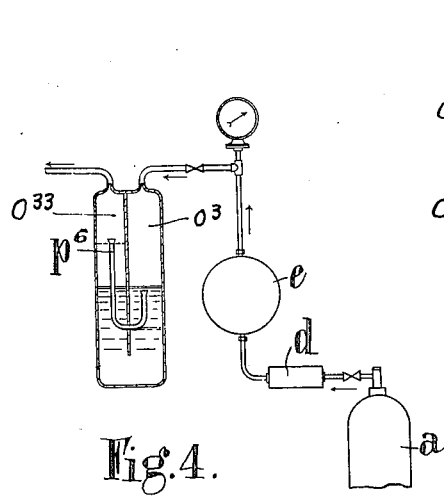

In Fig. 4 the gas depresses the liquid in the right hand chamber $o^3$ and raises the same in the chamber $o^{33}$ before the tube $p^6$ is unsealed.

Figure 5:
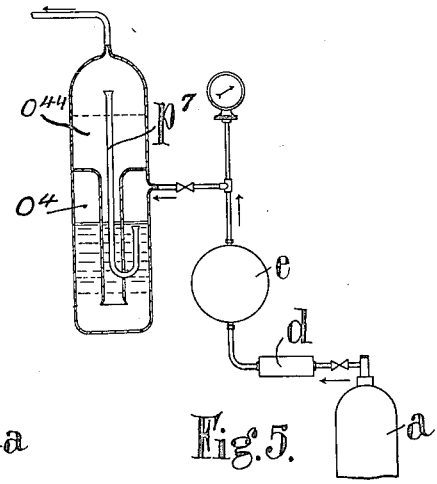

In Fig. 5 the gas causes depression of the liquid in chamber $o^4$ and elevates the same in chamber $o^{44}$ before the tube $p^7$ is cleared.

Figure 6:
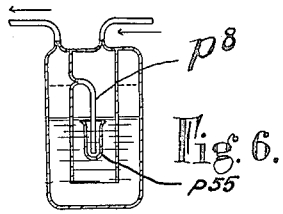
Figures 2 to 6 are diagrammatic views showing several modifications of a part of the apparatus shown in Figure 1.

Fig. 6 illustrates a device similar to that shown in Fig. 3 with the exception that the lower end of the tube $p^8$ enters a cup $p^{55}$ instead of terminating in a U-shaped extension.

It is to be understood that the invention is not to be confined to the details of construction hereinbefore given by way of example, nor to the particular application described, as the invention may be employed with equal effect and like advantage in the case of any operation in which a gas is to be added to a liquid in definite proportion to varying flows, and the means adopted for uniformly charging a small body of liquid with gas for automatically controlling the supply of liquid thus charged to the main body of liquid, and the arrangements for controlling and metering the flow of gas, may be varied to suit the particular applications of the invention or any particular practical requirements that may have to be fulfilled.

It is to be noted that the drawings are diagrammatic and that the dimensions and arrangement of parts in a practical apparatus may vary somewhat from that illustrated.

Having now described my invention, what I claim as new and desire to secure by Letters Patent is:—

1. In the sterilization of water or other liquid with chlorine, a method of measuring periodically the flow of predetermined volumes of chlorine consisting in obstructing the flow of chlorine by placing in the path of such flow a seal of liquid not appreciably affected chemically by and having no appreciable effect upon the chlorine, and permitting the chlorine to move the sealing liquid periodically through a space of definite volume in order to remove the obstruction and permit predetermined measured volumes of chlorine to flow.

2. In the sterilization of water or other liquid with chlorine, a method of measuring periodically the flow of predetermined volumes of chlorine consisting in obstructing the flow of chlorine by placing in the path of such flow a seal of liquid not appreciably affected chemically by and having no appreciable effect upon the chlorine, exerting pressure on the chlorine and permitting the chlorine under said pressure to move the sealing liquid periodically through a space of definite volume in order to remove the obstruction and permit predetermined measured volumes of said chlorine to flow.

3. In the sterilization of water or other liquid with chlorine, a method of measuring periodically the flow of predetermined volumes of chlorine consisting of obstructing the flow of the chlorine by placing in the path of such flow a seal of liquid not appreciably affected chemically by and having no appreciable effect upon the chlorine, permitting the chlorine to move the sealing liquid periodically through a space of definite volume in order to remove the obstruction and permit predetermined measured volumes of said chlorine to flow, impregnating small volumes of liquid uniformly with the measured volumes of chlorine, and admitting such chlorine impregnated liquid into the main body of liquid in quantities proportioned to the main flow of liquid to be treated.

4. An apparatus for sterilizing water or other liquid by the use of chlorine comprising a source of chlorine, a U-tube communicating with said source of chlorine and containing a body of sealing liquid not appreciably affected by and having no appreciable effect upon the chlorine, and a vent trap communicating with the legs of the U-tube and containing some of said sealing liquid, said trap being so connected to the U-tube that the sealing liquid in the U-tube must be displaced a predetermined distance by the chlorine before the sealing liquid is blown from said vent trap.

5. Apparatus for sterilizing water or other liquid by the use of chlorine comprising a source of chlorine gas, a U-tube connected therewith and having sulphuric acid therein, a vent conduit connected to the limbs of the U-tube and also containing sulphuric acid, and means for conveying the chlorine gas from said U-tube to a body of liquid.

6. Apparatus for sterilizing water or other liquid by the use of chlorine comprising a source of chlorine, a small body of liquid, means for delivering a measured quantity of chlorine to said small body of liquid, a main body of liquid, and means controlled by the main body of liquid for automatically delivering said chlorine impregnated liquid to the main body of liquid to be treated in proportion to the main flow of liquid.

7. Apparatus for sterilizing water or other liquid by the use of chlorine comprising a source of chlorine, a small body of liquid, means for delivering a measured quantity of chlorine to said small body of liquid, a reservoir for collecting the chlorine impregnated liquid, a main body of liquid, and means controlled by the main body of liquid for automatically drawing off such chlorine impregnated liquid in proportion to the main flow of liquid.

8. Apparatus for sterilizing water or other liquid by the use of chlorine comprising a source of chlorine, a small body of liquid, an absorber, means for regulating the flow of said small body of liquid and chlorine to the absorber, a reservoir for collecting the chlorine impregnated liquid, a main body of liquid, and means controlled by the main body of liquid for automatically drawing off such chlorine impregnated liquid in proportion to the main flow of liquid to be treated.

9. In apparatus according to claim 8, means for automatically switching on and off supplies of liquid and chlorine in definite ratio to the absorber.

10. Apparatus as claimed in claim 4 including a counter, and means controlled by the volume of liquid in the U tube for actuating said counter.

11. Apparatus for sterilizing water or other liquid by the use of chlorine comprising a source of chlorine gas under pressure, a U tube connected with said source of supply, a reducing valve between said U tube and said source of supply, a vent connecting the limbs of said U tube, a body of liquid within said U tube not substantially affected by and having no appreciable effect upon the chlorine gas and normally sealing said vent, means for conveying the chlorine gas from the U tube to the liquid to be treated and a counter put into operation by the movement of the liquid within the U tube.

12. An apparatus for supplying a mixture of liquid and gas to a main body of liquid comprising an absorber in which the liquid and gas are mixed, a liquid supply pipe connected to the absorber and having a pressure control valve, a supply tank for gas, a conduit connecting said tank with said absorber, a pressure control valve located in said conduit, a storage tank from which the mixture of liquid and gas from the absorber enter, means controlled by a float located within the storage tank for admitting and discharging pressure to and from the pressure control valves and means conducting the mixture from the storage tank to the main body of liquid.

13. An apparatus of the kind defined in claim 12 in which the last named conducting means includes automatic devices for varying the flow of the mixture relative to the volume of the main body of liquid.

14. In an apparatus for sterilizing liquids with chlorine, a measuring device including a tube adapted to be connected to a source of chlorine, a second tube provided with means for discharging chlorine and communicating with the first tube, a trap also placing said tubes in communication and having an inlet communicating with one tube at a point below its point of communication with the other tube, and a sealing liquid arranged in said tubes and trap and normally closing communication between the two tubes, said sealing liquid having no appreciable effect upon the chlorine and not being appreciably affected chemically by said chlorine.

In testimony whereof I have signed my name to this specification.

WILLIAM PATERSON.